US006215636B1

(12) United States Patent
Hellemans

(10) Patent No.: US 6,215,636 B1
(45) Date of Patent: Apr. 10, 2001

(54) DEVICE FOR SUPPLYING ELECTRIC POWER TO SEVERAL PARALLEL-FED CIRCUITS, AND METHOD FOR MAKING SAME

(75) Inventor: Roel Hellemans, Tournefeuille (FR)

(73) Assignee: Siemens Automotive, S.A., Toulouse-Cedex (FR)

(*) Notice: Subject to any disclaimer, the term of this patent is extended or adjusted under 35 U.S.C. 154(b) by 0 days.

(21) Appl. No.: 09/402,516

(22) PCT Filed: Mar. 12, 1998

(86) PCT No.: PCT/EP98/01449

§ 371 Date: Dec. 20, 1999

§ 102(e) Date: Dec. 20, 1999

(87) PCT Pub. No.: WO98/43325

PCT Pub. Date: Oct. 1, 1998

(30) Foreign Application Priority Data

Mar. 24, 1997 (FR) .................................................. 97 03557

(51) Int. Cl.[7] ........................ H01H 85/022; H01H 85/20; H02G 3/08; H02G 1/26

(52) U.S. Cl. .......................... 361/104; 361/626; 361/642; 337/187; 337/188; 337/189; 337/229

(58) Field of Search .................................... 361/104, 103, 361/626, 642, 646, 833, 837, 621, 622, 890; 337/158, 159, 161, 188, 189, 229, 256, 290, 187; 219/202, 481, 483–486, 501, 508, 509, 504, 505; 29/623

(56) References Cited

U.S. PATENT DOCUMENTS 2,978,665 * 4/1961 Vernet et al. ........................ 338/223
4,780,598 * 10/1988 Fahey et al. ......................... 219/511
4,842,534 * 6/1989 Mobley et al. ...................... 439/214
4,967,176 * 10/1990 Horsma et al. .................... 338/22 R
5,088,940 * 2/1992 Saito .................................... 439/621
5,089,688 * 2/1992 Fang et al. ........................... 219/505
5,425,099 * 6/1995 Takakura et al. .................... 379/413
5,438,310 * 8/1995 Ikari ..................................... 337/208
5,537,286 * 7/1996 Gozlan et al. ....................... 361/106
5,541,804 * 7/1996 Frederiksen .......................... 361/119
5,643,693 * 7/1997 Hill et al. ............................. 429/121
5,645,746 * 7/1997 Walsh .................................. 219/505
5,663,861 * 9/1997 Reddy et al. ........................ 361/106
5,731,944 * 3/1998 Yasukuni et al. .................... 361/104
5,777,541 * 7/1998 Vekeman ............................ 338/22 R
5,795,193 * 8/1998 Yang .................................... 439/621
5,818,676 * 10/1998 Gronowicz, Jr. ..................... 361/106
5,886,611 * 3/1999 Schaller et al. ...................... 337/189
5,977,859 * 11/1999 Kawamura et al. ................. 337/295
6,040,755 * 3/2000 Abe et al. .......................... 338/22 R

FOREIGN PATENT DOCUMENTS

4015816 * 11/1991 (DE) .................................... 361/833
0158410 * 10/1985 (EP) ................................ H05B/3/10
0739778A2 10/1996 (EP) .
2300528A 11/1996 (GB) .
63-278396 * 11/1988 (JP) ...................................... 439/487
11-16704 * 1/1999 (JP) ................................ H01C/7/02

* cited by examiner

*Primary Examiner*—Gerald Tolin
*Assistant Examiner*—Anatoly Vortman
(74) *Attorney, Agent, or Firm*—Herbert L. Lerner; Laurence A. Greenberg; Werner H. Stemer

(57) ABSTRACT

The device comprises a busbar (1') connected, on the one hand, to the source of electrical energy and, on the other hand, to a plurality of electrical contacts (**3'*i*) each forming part of one of the circuits. According to the invention, several self-resettable fuses (5'*i*) for protecting said circuits are soldered to said busbar (1'), these fuses each consisting of a layer of a dispersion of an electrically conductive particulate material in a polymer, said layer being laminated between first and second, plane and parallel, electrodes electrically connected to the busbar (1') and to said electrical contacts (3'*i***) of an associated circuit, respectively.

4 Claims, 1 Drawing Sheet

DEVICE FOR SUPPLYING ELECTRIC POWER TO SEVERAL PARALLEL-FED CIRCUITS, AND METHOD FOR MAKING SAME

BACKGROUND OF THE INVENTION

Field of the Invention

The present invention relates to a device for distributing electrical energy in several circuits supplied in parallel by a single source of electrical energy and, more particularly, to such a device of the type comprising a busbar connected, on the one hand, to said source and, on the other hand, to a plurality of electrical contacts each forming part of one of said circuits.

Such devices are known, these being designed to supply several electrical circuits mounted on a printed-circuit board and supplied in parallel by a single source of electrical energy, such as, for example, a battery, by means of a busbar connected to the battery and distributing the energy to each of the circuits. Such a solution is especially applicable in automobile electronics for supplying a plurality of circuits comprising relays, for controlling the electrical supply for actuators, and fuses for protecting these circuits.

These fuses must therefore be sized depending on the intensity of the maximum current that each circuit can withstand. They are each mounted between the busbar, which is normally connected to the positive pole of the battery, and an associated circuit to be protected. Mounting these fuses specific to each circuit therefore involves handling operations, and therefore costs, which adversely affect the manufacturing cost of the board which carries all the circuits, especially when it is a question of manufacturing electrical energy, of the type comprising a busbar connected, on the one hand, to said source and, on the other hand, to a plurality of electrical contacts each forming part of one of said circuits, this device being noteworthy in that it comprises a plurality of self-resettable fuses for protecting said circuits, these being soldered to said bushbar and each consisting of a layer of a dispersion of an electrically conductive particulate material in a polymer, said layer being laminated between first and second plane and parallel electrodes electrically connected on the one hand, to said source and, on the other hand, to a plurality of electrical contacts each forming part of one of said circuits, this device being noteworthy in that it comprises a plurality of self-resettable fuses for protecting said circuits, these being soldered to said busbar and each consisting of a layer of a dispersion of an electrically conductive particulate material in a polymer, said layer being laminated between first and second plane and parallel electrodes electrically connected to the busbar and to said electrical contacts of an associated circuit, respectively.

Advantageously, according to the invention, said fuses are electrically isolated from each other by grooves cut into the same sheet of said dispersion layer laminated between two plane and parallel electrodes, said grooves defining individual fuses having an area proportional to the maximum admissible current in the associated circuit.

The invention also provides a process for manufacturing the device according to the invention, in which a sheet consisting of a layer of a dispersion of an electrically conductive particulate material in a polymer, said layer being laminated between first and second electrodes, is soldered to the busbar, a plurality of grooves are cut in the thickness of said sheet, said grooves dividing the latter into a plurality of self-resettable fuses having an area proportional to the value of the maximum current that an associated circuit can withstand, and the busbar thus furnished with fuses is soldered to all of the circuits to be supplied so that the supply for each circuit is protected by one of said fuses.

As will be seen in greater detail later, this process makes it possible to manufacture the device according to the invention at low cost, the device furthermore having a small overall size.

Other features and advantages of the present invention will appear on reading the description which follows and on examining the appended drawing in which:

DESCRIPTION OF THE PREFERRED EMBODIMENTS

Figure 1:
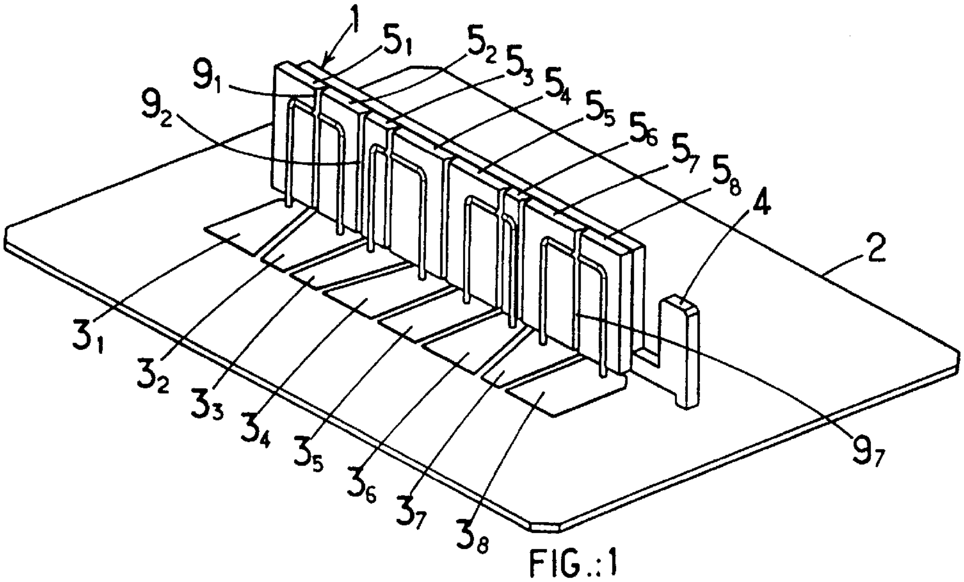
FIG. 1 is a perspective view of a first embodiment of the device according to the invention, mounted on a printed-circuit board carrying a plurality of circuits (not shown) supplied in parallel through this device.

FIG. 1 of the appended drawing shows a busbar 1 of plane, elongate and rectangular shape, as is conventionally found in the known devices for distributing electrical energy in several electrical (or electronic) circuits supplied in parallel or carried by the same printed-circuit board 2. Only that part of the printed-circuit board which is adjacent to the busbar has been shown in the drawing. The circuits supplied are not shown in the drawing for the sake of clarity, apart from electrical contacts in the form of conducting areas 31, 32, . . . **3*i*, etc. (i=1 to n) formed on the board 2, each conducting area constituting a supply terminal for one of the n circuits, this terminal being connected via the busbar 1 to a source of electrical energy (not shown) common to all the circuits. To do this, this source, consisting for example of a storage battery, is connected via its positive terminal to a connection pin 4 formed integrally in said busbar 1**, for example at one of the ends of the latter, as shown.

According to the invention, several fuses 51, 52, . . . **5*i*, . . . etc. are soldered flat to the busbar 1, each protecting one of the circuits carried by the board 2, each fuse being sized according to the maximum current that the associated circuit can withstand. The fuses 5*i* each consist of a layer 8 of a dispersion of an electrically conductive particulate material in a polymer, which layer is laminated between first (6) and second (7) plane and parallel electrodes, as may be seen in FIG. 3 which shows a partial sectional view, in the thickness, of the assembly consisting of the busbar 1 and the fuses 5*i*. The first electrode 6 is soldered flat to the busbar 1 and the second electrode 7 (visible in FIG. 1) is electrically connected to an associated area 3*i*** by means which will be described later.

Such fuses are known, especially those sold by the United States company Raychem Corporation under the registered trademark POLYSWITCH. The layer 8 laminated between the two electrodes 6, 7 comprises a conductive particulate material, such as carbon, graphite, a metal, a metal oxide, a conductive polymer as particles, or a combination of such materials. The particulate material is dispersed in an organic polymer, preferably a crystalline polymer, an amorphous thermoplastic polymer, an elastomer or a combination of such polymers. Other agents may be added to such a composition, such as antioxidants, crosslinking agents, stabilizers, etc.

Such a composition may have a positive temperature coefficient so that its electrical resistance at room temperature is low. However, passing a current causes it to heat up, the particles of the conductive material starting to lose their contacts and the resistance of the composition increases greatly and abruptly, above a temperature called the "switch temperature". It is this property which is exploited in the application of such a composition to the production of fuses. These are called "self-resettable" since, when the temperature of the dispersion drops again, after the current has been cut off, the contact between the conducting particles is reestablished and the current starts to flow again through the fuses in order for the associated circuits to be supplied again.

With self-resettable fuses of the type described above, the intensity of the current that each fuse can withstand, before reaching its switch temperature, depends on the volume of the dispersion, and therefore on the area of the fuse. Knowing the maximum intensity that each of the circuits to be supplied can withstand, it is conceivable to cut from a starting sheet, consisting of the abovementioned dispersion laminated between two electrodes, a plurality of suitably sized fuses and then subsequently to individually solder them in a line to the busbar.

It will be noted incidentally that the busbar then functions as a heat sink, and therefore as a radiator with respect to the fuses, thereby increasing the intensity of the current causing the fuses to switch. It is therefore possible to reduce the area of the latter, which is economical.

It will be understood that the steps of individually cutting the fuses and individually soldering said fuses to the busbar involve handling operations which adversely affect the cost of manufacturing such busbars provided with fuses.

Figure 2:
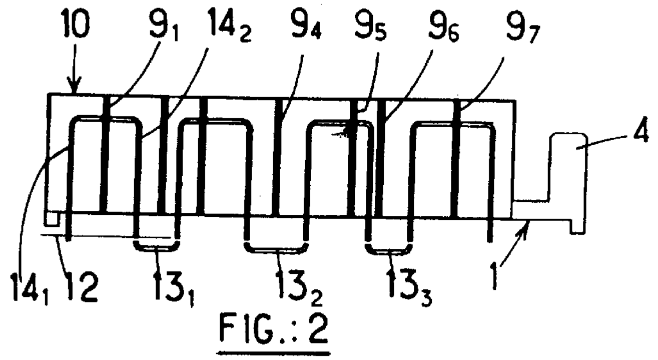
FIG. 2 is a plan view of a busbar equipped with fuses, forming part of the device in FIG. 1.

According to the present invention, in order to produce such a busbar, a coextensive sheet formed like the self-resettable fuses described above is soldered to said busbar, as may be seen in FIGS. 1 and 2.

Figure 3:
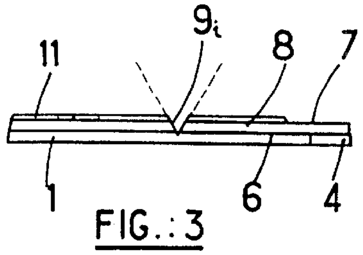
FIG. 3 is a detailed view explaining how two adjacent fuses are isolated from each other on the busbar in FIG. 2.

Next, several straight and parallel grooves 9*i* are cut into said sheet (see FIG. 3), which grooves divide the sheet into a plurality of fuses 5*i* having a predetermined area, each including a first electrode 6 and a second electrode 7 which grip a layer 8 of a dispersion as described above. As shown in FIG. 3, the depth of the grooves 9*i* is equal to, or slightly greater than, the thickness of the starting sheet (6, 7, 8) so as not to appreciably erode the subjacent busbar which ensures the mechanical cohesion of the set of fuses. The grooves 9*i* are perpendicular to the large dimension of the busbar 1.

As was seen earlier, the area of each fuse must be in proportion to the maximum intensity of the current that the circuit protected by this fuse can withstand. Knowing the size of each fuse allows the area of the starting sheet to be calculated, by adding the areas of each of them. The position of the grooves to be cut in the starting sheet also obviously stems from these sizes.

Soldering the starting sheet and then forming the grooves 9*i* in this sheet are operations which can be completely automated in a manufacturing line. The grooves may be cut by sets of cutting disks, for example suitably arranged one with respect to another.

Thus, it is clear that the invention rationalizes the formation and the installation of the fuses necessary for protecting the circuits, by making the fuses in the form of a unitary assembly fastened by the busbar. The operations necessary for individually manufacturing the fuses, and then for individually fitting them, are thus eliminated, this being favorable to reducing the manufacturing cost of the device according to the invention.

Of course, it is necessary to establish an electrical link between the electrode 7 of a fuse and the corresponding area 3*i* of the associated circuit. In the embodiment of the invention illustrated in FIGS. 1 and 2, a wire 11 made of an electrically conductive material is soldered to the second electrode of the starting sheet before the grooves 9*i* are cut. As shown in FIG. 2, this wire takes the form of a crenellation extending parallel to the line of fuses and projecting from the surface of the starting sheet beyond an edge parallel to the alignment of the fuses. The pitch of the crenellation is chosen so that the wire projects from each fuse, whatever the area of the latter.

Next, the starting sheet is cut, as mentioned earlier, in order to form the grooves 9*i* and to cut the wire 11 in line with these grooves. The conducting wire is also cut along the cutting line 12 so as to detach parts 131, 132, 133 of the crenels of the wire, as illustrated in FIG. 2. The wire is then divided into elements 141, 142, etc., each being fastened to the only electrode 7 of the associated fuse and each electrically isolated from each other.

Finally, the end of the wire element 14*i* is soldered to the corresponding pin 3*i* of the associated circuit in order to establish an electrical contact between this circuit and the source of energy (not shown) connected to the pin 4 of the busbar 1 via the corresponding protective fuse 5*i*.

The busbar 1, thus furnished with fuses, is designed to be soldered to the board 2 in a plane perpendicular to the board, as shown in FIG. 1.

Figure 4:
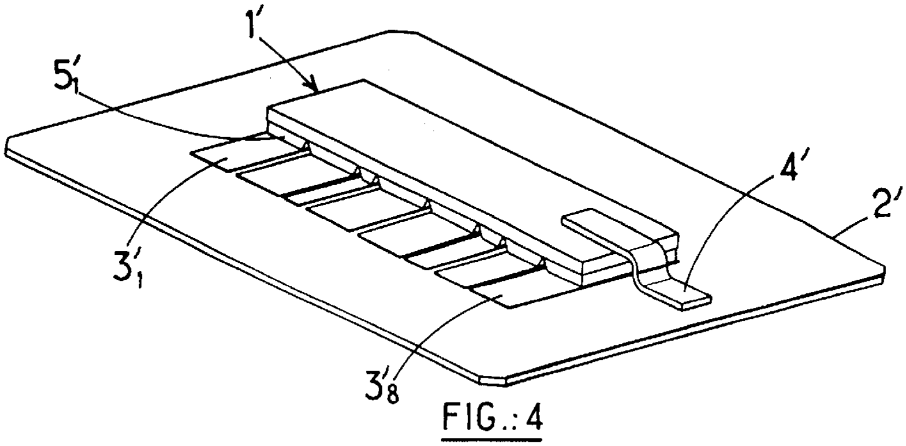
FIG. 4 is a perspective view of a second embodiment of the device according to the invention.

FIG. 4 shows another embodiment of the device according to the invention, in which a busbar 1', furnished with fuses 5'*i* (i going from 1 to 8) soldered flat to this busbar, is itself soldered flat to conducting areas 3'*i* formed on a board 2' and acting as the area 3*i* of the embodiment in FIG. 1. The busbar 1' is itself connected to a source of electrical energy via a pin 4' which is soldered, for example, to this busbar. It is clear that this particularly compact arrangement of the busbar and of the fuses is well suited to environments in which the space is measured.

The device consisting of the busbar and the fuses, as shown in FIG. 1 or in FIG. 4, forms a whole which can be handled by machines for automatically mounting components on printed-circuit boards. In particular, the device in FIG. 4 may be handled by these machines like any SMC component to be surface-mounted.

Of course, the invention is not limited to the embodiments described and shown, these having been given merely by way of example. Thus, a first electrode common to all the fuses could be cut so as to also constitute the busbar itself.

The invention is not limited to its automobile electronics applications either and can also be applied everywhere where several circuits have to be supplied in parallel by the same source of electrical energy, for example in home electronics.

What is claimed is:

1. A device for distributing electrical energy to a plurality of electrical circuits supplied in parallel from a single source of electrical energy, comprising:

a busbar connected to a source of electrical energy;

a plurality of electrical contacts each connected to said busbar and forming a part of a respective circuit to be supplied with electrical energy from the source of electrical energy;

a plurality of self-resetting fuses soldered to said busbar, each of said fuses being formed of a laminate including a dispersion layer of a dispersion of an electrically conductive particulate material in a polymer between first and second plane and mutually parallel electrodes electrically connected to said busbar and to said electrical contacts, respectively, said fuses being electrically isolated from one another by grooves formed in said dispersion layer between said electrodes, said grooves defining individual fuses with an area proportional to a maximally admissible current in the respectively associated circuit.

2. The device according to claim 1, wherein a set of said fuses is formed as an approximately rectangular bar with a relatively longer side, said grooves separating said fuses being straight, mutually parallel grooves extending perpendicularly to the relatively longer side of said bar.

3. The device according to claim 1, which further comprises an electrically conductive wire soldered to a surface of each of said second electrodes and projecting from the surface and establishing an electrical contact with the associated electrical circuit.

4. The device according to claim 1, wherein each of the circuits is electrically connected with a conducting area pad on a printed-circuit board and each of said second electrodes is soldered flat to a respective conducting area pad.

* * * * *